J. RODGERS.
REACH ATTACHMENT FOR VEHICLES.
APPLICATION FILED JUNE 4, 1908.
929,020.
Patented July 27, 1909.
2 SHEETS—SHEET 1.
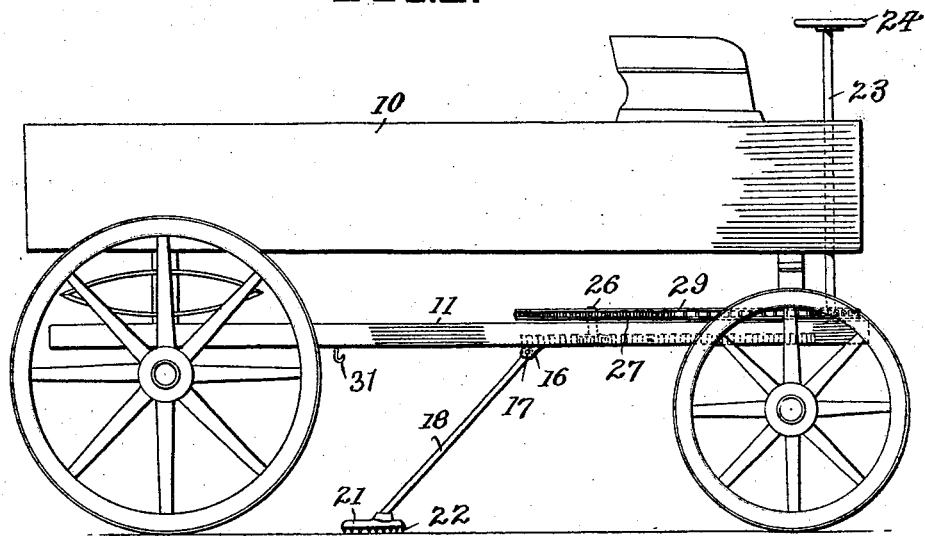
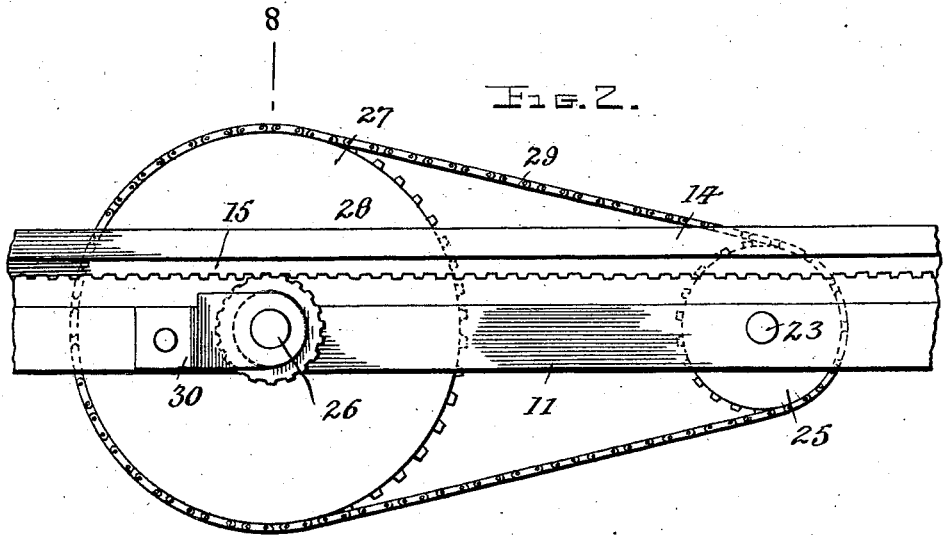
Witnesses
Inventor
John Rodgers
By
Attorneys

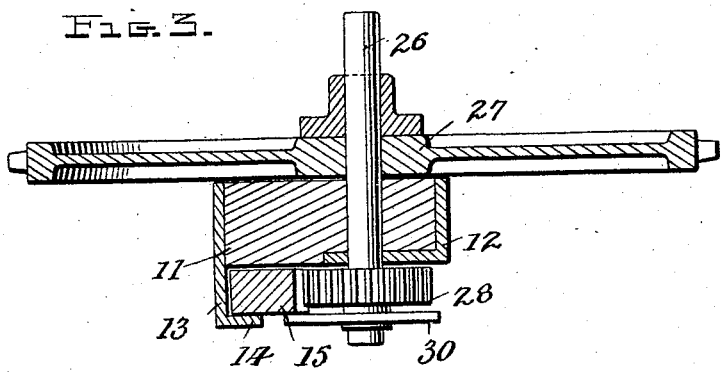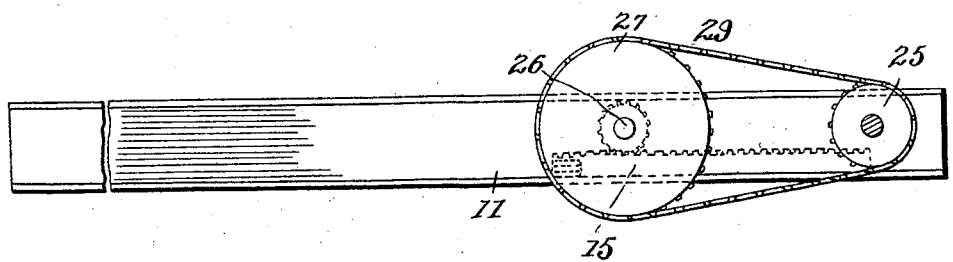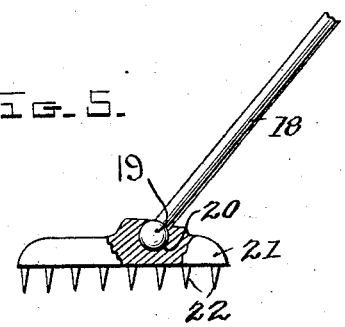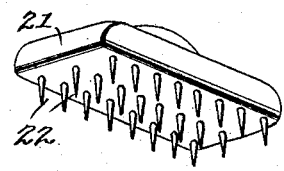

UNITED STATES PATENT OFFICE.

JOHN RODGERS, OF GULLIVER, MICHIGAN, ASSIGNOR OF ONE-HALF TO PETER JOHNSON, OF GULLIVER, MICHIGAN.

REACH ATTACHMENT FOR VEHICLES.

No. 929,020.      Specification of Letters Patent.      Patented July 27, 1909.

Application filed June 4, 1908. Serial No. 436,670.

*To all whom it may concern:*

Be it known that I, JOHN RODGERS, a subject of the King of England, residing at Gulliver, in the county of Schoolcraft, State of Michigan, have invented certain new and useful Improvements in Reach Attachments for Vehicles; and I do hereby declare the following to be a full, clear, and exact description of the invention, such as will enable others skilled in the art to which it appertains to make and use the same.

The invention relates to a reach attachment for vehicles, and more particularly to a sustaining device for loaded wagons.

The primary object of the invention is the provision of a reach attachment having an extensible means provided with a ground engaging element, so that when it is desired to start a wagon on a slippery street, either on the level or upgrade, the teamster upon actuating the reach attachment can effect an initial start to said wagon and in this manner will assist and ease the moving of the wagon by the draft animals, and furthermore will at the same time overcome any liability of the backing of said wagon while effecting the starting of the same should it be necessary on an upgrade.

Another object of the invention is the provision of a reach attachment having an adjustable extension provided with a ground engaging element, such as a foot to automatically lock or brace a loaded wagon on an upgrade to prevent said wagon from traveling backward on the upgrade, and at the same time relieve the draft horses from the weight of the load, when a sudden slacking up or stop is made on the grade.

In the drawings accompanying and forming part of this specification is illustrated in detail one advantageous form of embodiment of the invention, which, to enable those skilled in the art to practice said invention, will be set forth at length in the following description, while the novelty of the invention will be included in the claims succeeding said description.

In the drawings:—Figure 1 is a side view of the invention applied to a wagon. Fig. 2 is a bottom fragmentary view of a portion of the reach detached from the wagon and having its coöperative mechanism. Fig. 3 is a transverse sectional view on the line 8—8 of Fig. 2. Fig. 4 is a top plan view of the reach and its coöperative mechanism. Fig. 5 is a fragmentary view partly in section of the ground engaging foot and its leg the latter being detached from the extension. Fig. 6 is a detail view of the bottom of the foot.

Similar reference characters indicate corresponding parts throughout the several views in the drawings.

In the drawings the numeral 10 designates generally the wagon having in its running gear frame a reach bar 11 extending longitudinally of said wagon, and throughout the longitudinal extent of one edge of this reach bar is an angle iron 12 for reinforcing said bar 11 at its side edge and for portions of its width at the under face thereof. At the opposite side edge of the reach bar 11 is a reinforcing plate 13 having an inwardly projecting flange 14 at right angles thereto and extending throughout the longitudinal extent of the same to form a support and guideway for a rack bar 15 slidably mounted therein. At the rearward end of the rack bar 15 are depending ears 16 supporting a pivot 17 connected to a leg 18 the lower end of which has a ball terminal 19 in engagement with a ball socket 20 formed in a foot 21 having projecting teeth 22 adapted to engage the ground which teeth prevent said foot 21 from slipping thereon.

Rotatably mounted in the reach bar 11 is a vertical shaft 23 having at its upper end a manually operable wheel 24. Above said reach bar 11 and fixedly secured to the shaft 23 is a small sprocket wheel 25 which rotates with said shaft. At a distance removed from said sprocket wheel 25 and rotatably mounted in the reach bar 11 is a stud shaft 26 having fixed thereto above the said reach bar a large sprocket wheel 27 with respect to the sprocket 25. Below the reach bar 11 and carried by the stud shaft 26 is a pinion 28 in mesh with the rack bar 15 to impart sliding movement thereto.

Trained over the sprocket 25 and the sprocket wheel 27 is an endless sprocket chain 29 through the medium of which motion imparted to sprocket 25 is conveyed or imparted to the sprocket wheel 27 thereby rotating the pinion 28 which latter actuates the rack bar 15 to move the same longitudinally with respect to the reach bar 11 so as to position the foot 21 in engagement with the ground, the function of said foot and its leg 18 being for the purpose of starting the wagon 10 and also to form an impediment against back movement of the wagon 10 when on a grade.

It will be apparent that the angle bar 12 forms a bearing for the pinion 28 at its inner face thereof. Connected to the under side of the reach bar is a strap hanger 30 forming a bearing for the stud shaft 26 and also a bearing for the outer face of said pinion 28 and the rack bar 15. To maintain the leg 18 elevated when inoperative there is provided a hook member 31 secured to the under side of the reach bar 11 and this member may be located or positioned on the reach bar at any desirable point.

In operating and assuming that the wagon is at a standstill on a slippery grade, the teamster when he finds it necessary to start the wagon grips the wheel 24 and by rotating the same actuates the sprocket 25 through the medium of the shaft 23 and by the travel of the sprocket chain 29 trained over said sprocket 25 and sprocket wheel 27 the latter in turn rotates pinion 28 in mesh with the rack bar 15 which latter is caused to slide longitudinally on the reach bar 11 and in this manner the leg 18 positions the foot 21 in contact with the ground so as to have the teeth 22 biting into the same whereby the wagon 10 will be given an initial movement so that the same can be started on its travel in an easy manner by the draft animals.

After the wagon has been started and when the same is traveling, the leg 18 carrying the foot 21 must be held in an elevated position and to effect this the said leg is brought to engagement with the hook member 31 by the operator.

Having described the invention, what is claimed is:—

1. In a wagon having a reach bar, a slidable rack bar thereon, a leg pivotally connected to said rack bar, a ground engaging foot having a knuckle joint connection with the said leg, a stud shaft rotatably mounted in the reach bar and having a pinion engaging the rack bar, a sprocket wheel fixed to said stud shaft, and manually operable means for actuating this sprocket wheel.

2. In an attachment of the class described, the combination with the reach bar, of a rack bar slidable on said reach bar, a pinion in mesh with said rack bar, a rotatable sprocket wheel having connection with the pinion, a driving shaft rotatably mounted on the reach bar, a sprocket fixed to said shaft, a chain trained over the sprocket and sprocket wheel, a leg pivotally connected to said rack bar, a toothed ground foot flexibly connected to said leg, and manually operable means for rotating this driving shaft.

In testimony whereof, I affix my signature, in presence of two witnesses.

JOHN RODGERS.

Witnesses:
A. H. JOHNSON,
FRED COWMAN.